United States Patent [19]
Nakamura

[11] Patent Number: 5,535,798
[45] Date of Patent: Jul. 16, 1996

[54] HEAVY DUTY RADIAL TIRE INCLUDING A TREAD HAVING REENTRANTS

[75] Inventor: Hiroshi Nakamura, Hyogo, Japan

[73] Assignee: Toyo Tire & Rubber Co., Ltd., Osaka, Japan

[21] Appl. No.: 149,848

[22] Filed: Nov. 9, 1993

[30] Foreign Application Priority Data

Nov. 9, 1992 [JP] Japan ..................................... 4-298914

[51] Int. Cl.$^6$ ................................................. B60C 101/00
[52] U.S. Cl. ......................................................... 152/209 R
[58] Field of Search ............................ 152/209 R, 209 D

[56] References Cited

U.S. PATENT DOCUMENTS

| | | | |
|---|---|---|---|
| 2,706,509 | 4/1955 | White ................................. | 152/209 R |
| 2,779,378 | 1/1957 | Robertson ............................ | 152/209 R |
| 3,055,410 | 9/1962 | Caulkins .............................. | 152/209 R |
| 4,114,671 | 9/1978 | Maiocchi et al. .................... | 152/209 R |
| 4,230,512 | 10/1980 | Makino et al. ...................... | 152/209 R |
| 4,423,760 | 1/1984 | Treves et al. ........................ | 152/209 R |
| 4,926,919 | 5/1990 | Hopkins et al. ..................... | 152/209 R |
| 5,099,899 | 3/1992 | Takeuchi ............................. | 152/209 R |
| 5,154,216 | 10/1992 | Ochiai et al. ........................ | 152/209 R |
| 5,246,049 | 9/1993 | Ranicke et al. ..................... | 152/209 R |

FOREIGN PATENT DOCUMENTS

| | | |
|---|---|---|
| 0252006 | 12/1985 | Japan . |
| 0115703 | 6/1986 | Japan . |
| 0215603 | 8/1989 | Japan . |
| 2053609 | 2/1990 | Japan . |

*Primary Examiner*—Steven D. Maki
*Attorney, Agent, or Firm*—Koda and Androlia

[57] ABSTRACT

A heavy duty radial tire having a rib pattern tread comprising a plurality of straight circumferential grooves and ribs formed therebetween. Formed on at least one groove wall are reentrants increasing in width and depth toward the bottom of the groove and thereby the occurrence of furrow wear at rib edges is prevented.

4 Claims, 4 Drawing Sheets

HEAVY DUTY RADIAL TIRE INCLUDING A TREAD HAVING REENTRANTS

BACKGROUND OF THE INVENTION

1. Field of the Invention

This invention relates to a heavy duty radial tire having a tread of a rib pattern and more particularly to an improvement in the prevention of irregular wear which occurs on the edges of ribs formed between circumferential grooves.

2. Prior Arts

Generally employed for large vehicles such as trucks and buses are heavy duty radial tires provided with ribs formed between circumferential grooves having zigzag edges for good traction property on a wet surface. Tires of this type are susceptible to irregular wear such as step wear, that is, earlier wear of the outer edges of ribs arranged at the outermost position in the widthwise direction of the tread which occurs earlier than the other portion of the tread and progresses along the outer edges of the ribs as well as toward the center of the tread, or furrow wear, that is, earlier wear of the rib edges which protrude into the grooves and which is easily deformed when in contact with the ground, which occurs In an initial stage of tire travelling and progresses toward the center of the ribs.

It is known that such irregular wear occurs at an initial stage of tread wear and progresses preferentially but such irregular wear does not occur in the course of tread wear if it does not occur at an initial stage of tread wear. There have been made some proposals for the prevention of such irregular wear. U.S. Pat. No. 4,230,512, for example, proposed to prevent the occurrence of step wear by providing narrow circumferential grooves at the slightly inward positions from the outer edges of the outermost ribs. Since furrow wear starts from both zigzag edges of the rib which protrude into the grooves, there have been provided tires having the circumferential grooves made straight to provide the ribs free from zigzag edges or lateral unevenness. However, the tires provided with straight grooves and ribs are deficient in stopping ability on a wet ground, and also have a poor furrow wear prevention effect. There have been also provided tires having a plurality of sipes extending laterally from the rib edges and disposed at short intervals in the circumferential direction along the rib edges, in order to enhance the stopping ability on a wet ground and the prevention of furrow wear. Such tires, however, are not fully convincing.

SUMMARY OF THE INVENTION

It is therefore an object of the present invention to provide a heavy duty radial tire which can effectively prevent the occurrence of furrow wear at the rib edges on both sides of circumferential grooves of a tire.

In general, the cross-section of straight circumferential grooves is V-shaped in order to diminish stone retaining, and the rib base is wider than the ground contact area of the rib. Besides, the rib base is close to a steel cord belt. Accordingly, the rib which comes into contact with the ground during tire rotating becomes compressed and bulged due to the vertical stress of the load. The extent of the bulge is greater in the vicinity of the ground contact area having a narrower width than at the rib base, so that the extent of rubber movement due to deformation is greater in the vicinity of the ground contact area.

In addition, the slant angle of the groove wall to a line vertical to the ground contact area of the rib becomes large near the rib edge, so that the lateral shearing stress caused by the compression and increased in rough proportion to the extent of the slant angle also increases. With regard to the lateral distribution of the shearing stress, it becomes larger in proportion to a distance far from the rib center. The rib surface does not move easily due to the frictional resistance caused by the contact with the ground, but when the shearing stress at the rib edge exceeds the frictional resistance, the rubber of the rib edge slides toward the grooves because the static friction changes to dynamic friction and the coefficient of friction becomes low. The sliding movement of the rubber reduces the coefficient of friction against the slip in the vertical direction to the sliding movement, that is, the slip in the direction of the rotation of the tire, whereby the rib edge is likely to slip in the direction of the rotation of the tire. As a result, when the rib comes into contact with the ground with compression and deformation, the rib edges slide along the ground and extends into the grooves, while the central area of the rib only becomes thinner. This is thought to be the cause of furrow wear.

These phenomena remarkably appear when the rigidity of the rib base is high, because the lateral shearing stress near the rib edges is increased.

Based on the above observation, this invention provides a heavy duty radial tire having straight circumferential grooves while preventing the occurrence of furrow wear and enhancing the stopping ability on a wet ground even when the grooves becomes shallow due to tread wear, by reducing the rigidity of the rib base so that the bulge of the rib caused by the load is transferred toward the rib base as close as possible and the movement of rubber is diminished at the rib edges. Namely, the present invention provides a heavy duty radial tire having a rib pattern tread comprising a plurality of straight circumferential grooves and ribs formed therebetween, wherein a plurality of reentrants which increase in width and depth toward the bottom of the groove are formed on at least one groove wall of at least a pair of grooves, preferably of the outermost grooves on the tread.

The reentrants are formed either from groove edges or lower level of the grooves to the bottom of the grooves. The end of the reentrant at the groove edge side is preferred not to be open at the tread surface, but the reentrant could be made larger, with open end at the tread surface. The pitch of the reentrants disposed in the circumferential direction of the tire is 0.3 to 1.5 times the depth of the groove. Where the pitch is larger than 1.5 times the depth of the groove, the occurrence of furrow wear is not prevented efficiently, because the effect of the reentrants in reducing the rigidity of the rib base does not reach the center of the distance between two adjacent reentrants. Where the pitch is smaller than 0.3 times the depth of the groove, the rigidity and strength of the rib surface become too small, so that chipping or breakage is likely to occur. In addition, the depth of the reentrants shall be designed to be small, so that the stopping ability on a wet ground is not improved.

When the reentrants are formed on both walls of the groove in a zigzag fashion when viewed from the tread surface, it is preferable that the tips of the zigzag on one groove wall face the troughs of the zigzag on the other, so that the tips and troughs makes pairs so as to make the groove width uniform. If they are not paired up in this fashion, the tips of the reentrants narrow the groove width and thereby the removability of water between the tread and a wet ground is reduced. As a result, traction and stopping ability can not be maintained when the grooves become shallow due to tread wear.

In this invention, "rib" means a land area formed between the circumferential grooves on the tread as well as a land area lying between the laterally outermost circumferential grooves on the tread and tire shoulder portions, and include a land area which is cut laterally with sipes and a land area which is cut with lateral grooves having a depth of not more than one third of the depth of the circumferential groove. This invention also prevents the occurrence of the furrow wear on such cut ribs as well.

As the heavy duty radial tire in accordance with the present invention has a plurality of reentrants formed at the groove wall and increasing in width and depth toward the bottom of the groove, the rigidity of the rib base can be so reduced that the bulge of the groove wall under a loaded condition is transferred toward the groove bottom and thereby the movement of the rubber at the rib edges can be suppressed to minimum. Such less movement of the rib edges in the lateral direction also diminishes the slip of the rib edges in the circumferential direction of the tire which is induced by such lateral movement, and thereby the occurrence of the furrow wear is prevented. Since the reentrants formed on the groove wall increase in width and depth toward the groove bottom, the zigzag configuration becomes intensive in proportion to the extent of the tread wear through tire running, whereby the stopping ability and traction on a wet ground are ensured.

DETAILED DESCRIPTION OF THE INVENTION

Figure 1:
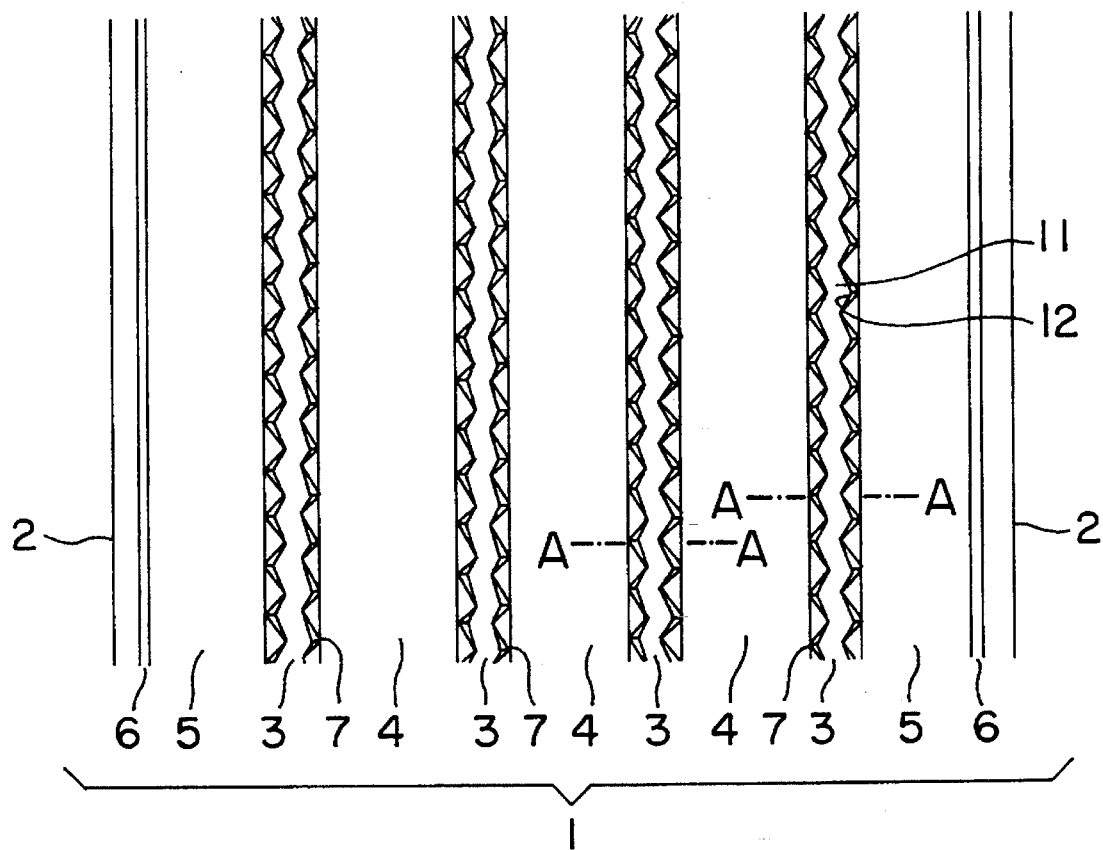
FIG. 1 is a schematic representation of a rib pattern showing one embodiment of a heavy duty radial tire of the present invention.
Figure 2:
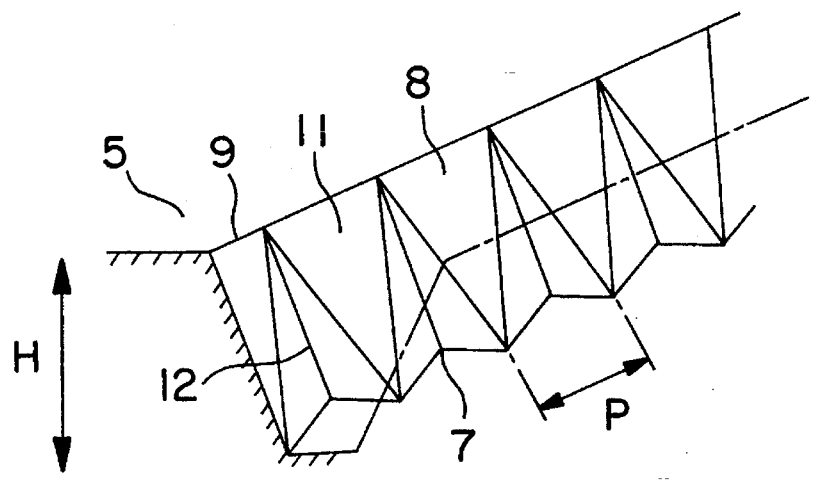
FIG. 2 is a partially enlarged perspective view of the circumferential groove of the tire shown in FIG. 1.
Figure 3:
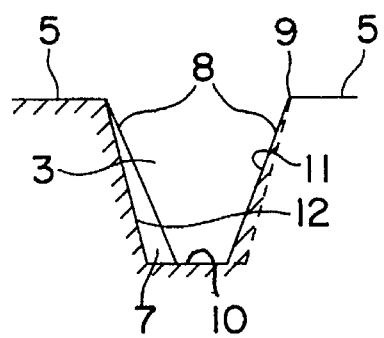
FIG. 3 is a cross sectional view along the line A—A of FIG. 1.
Figure 4:
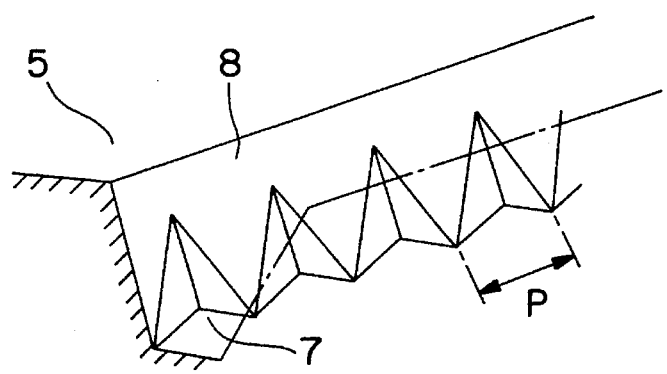
FIG. 4 is a partially enlarged perspective view of the circumferential groove of the tire showing another embodiment of the heavy duty radial tire of the present invention.

In the drawings, 1 is a tread and 2 are tread edges. Formed on the tread 1 are circumferential grooves 3 extending in the circumferential direction of the tire. 4 are ribs formed between the grooves 3. 5 are outermost ribs. 6 are narrow circumferential grooves provided at the outer sides of the outermost ribs 5. 7 are reentrants formed on slant faces of groove walls 8 of the circumferential grooves 3. As shown in FIGS. 2 and 4, reentrants 7 are in the form of a trigonal pyramid. In this embodiment, the reentrants are formed from open ends (groove edges) 9 of the circumferential grooves 3 to groove bottoms 10 in such a manner that they increase in width and depth toward the groove bottom 10. Further, in this embodiment, tips 11 and troughs 12 of the zigzag reentrants 7 face each other through the grooves 3 and make pairs. P represents a pitch interval of reentrants 7 at the groove bottoms 10, and H represents a depth of the grooves 3.

In the above tire, the rigidity of the rib base is reduced in comparison with conventional tires due to the existence of the reentrants 7 formed on groove walls 8 and increasing in width and depth toward the groove bottom 10, and the extent of the movement of the rubber on the groove wall faces due to a load applied on the ribs is greater toward the rib bases (groove bottom) than toward the rib surfaces (open ends of the grooves) in comparison with conventional grooves. As a result, the sliding movement of the rib surfaces which occurs over the frictional resistance with the contact ground is reduced, and the reduction of the circumferential frictional resistance is also suppressed in proportion to the reduction of the sliding movement. While the reduction of the circumferential frictional resistance is largest at the rib edges, so the occurrence of furrow wear at the rib edges can be prevented. In addition, since reentrants 7 formed on groove walls 8 increase in width and depth toward the groove bottom 10, the zigzag configuration becomes intensive in proportion to the extent of the tread wear, and ensures the stopping ability on a wet ground.

Figure 5:
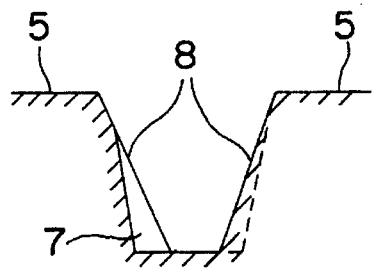
FIG. 5 is a cross sectional view of the groove in FIG. 4.
Figure 6:
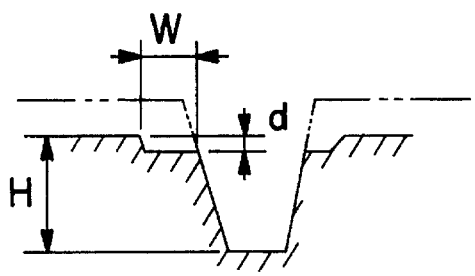
FIG. 6 is a cross sectional view of the groove showing the intensity of irregular wear.

Incidentally, the present invention is not limited to the above embodiment. For example, as shown in FIG. 4 and FIG. 5, the reentrants 7 may be formed from lower level of the groove 8 to the groove bottom 10. The cross-sectional configuration of reentrants 7 need not be triangular, and may be of a different cross-sectional configuration. Further, while tips 11 and troughs 12 of the zigzag reentrants 7 face each other through the grooves 3 and make pairs in the above embodiment, it is naturally possible to have tips 11 or troughs 12 face each other respectively. Moreover, while all groove walls have the reentrants 7, they may be formed only in the grooves most susceptible to furrow wear.

For testing purpose, embodiment tires in accordance with the present invention having the tire size of 11R22.5 and the groove depth of 14 mm were mounted to a 2-D-D type tractor as the front tires and measurements were made on the irregular wear resistance and stopping ability on a wet ground with the tread wear by 30%. The results are shown in Table 1. For comparison purposes, tires having conventional zigzag grooves were prepared.

Stopping ability on a wet ground is evaluated using an index assuming the value for the tire of comparison example 1 to be 100. The smaller the index, the better the stopping ability is. Irregular wear resistance is also evaluated using an index assuming the intensity of furrow wear of the comparison example 1 to be 100. The smaller the index, the better the resistance is.

The intensity of furrow wear is measured by the depth of wear (h) by the width of wear (w)(h×w). Irregular wear resistance was tested with the premise of travelling distance of 24,000 km per 1 mm of tire on a ground of good condition which is likely to cause the irregular wear.

It is apparent from Table 1 that embodiment tires 1 to 3 are superior in irregular wear resistance and stopping ability on a wet ground in comparison with comparison example 1 having conventional zigzag grooves. Comparison example 3 having the reentrant pitch P twice as large as the depth of the groove H (P=2 H) was not so different from comparison example 1 having the conventional grooves in the irregular wear resistance and furrow wear occurs at the zigzag tips. Stopping ability was inferior than comparison example 1. In comparison example 2 having the reentrant pitch P one-fifth of the groove depth H (P=0.2 H), the zigzag tips was cut away and wear like a sawtooth occurred.

TABLE 1

Figure 13:
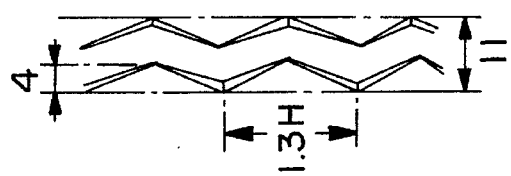
FIGS. 11, 12 and 13 are the tread patterns for the embodiments shown in Table 1.
Figure 12:
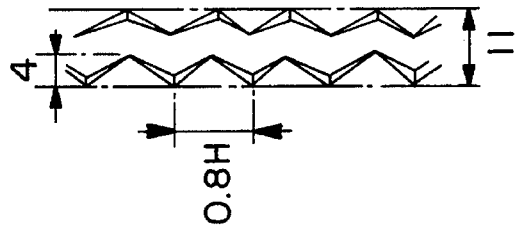
Figure 11:
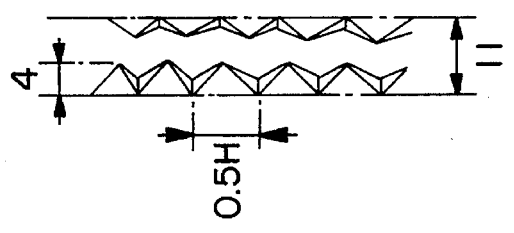
Figure 10:
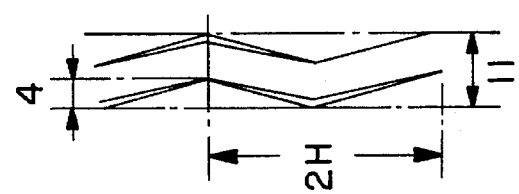
FIGS. 8 through 10 are tread patterns for the comparative examples in Table 1.
Figure 9:
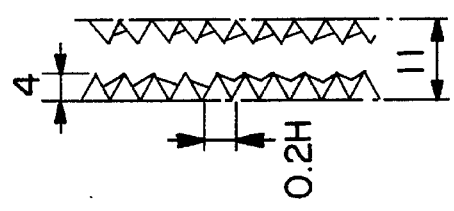
Figure 8:
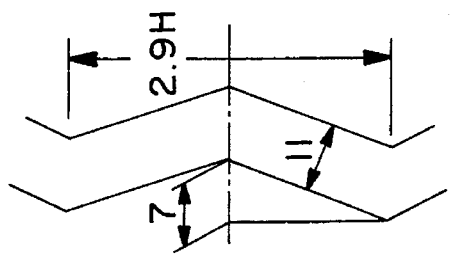

|  | COMPARISON EXAMPLES | | | EMBODIMENTS | | |
| --- | --- | --- | --- | --- | --- | --- |
|  | 1 | 2 | 3 | 1 | 2 | 3 |
| Reentrant pitch | — | 0.2 H | 2 H | 0.5 H | 0.8 H | 1.3 H |
| Tread pattern | FIG. 8 | FIG. 9 | FIG. 10 | FIG. 11 | FIG. 12 | FIG. 13 |
| Characteristics |  |  |  |  |  |  |
| stopping ability on a wet ground (Index) | 100 | 93 | 88 | 108 | 105 | 103 |
| irregular wear (Index) | 100 | unmeasurable | 98 | 45 | 48 | 55 |
| trouble observed | — | * | ** | — | — | — |

Figure 7:
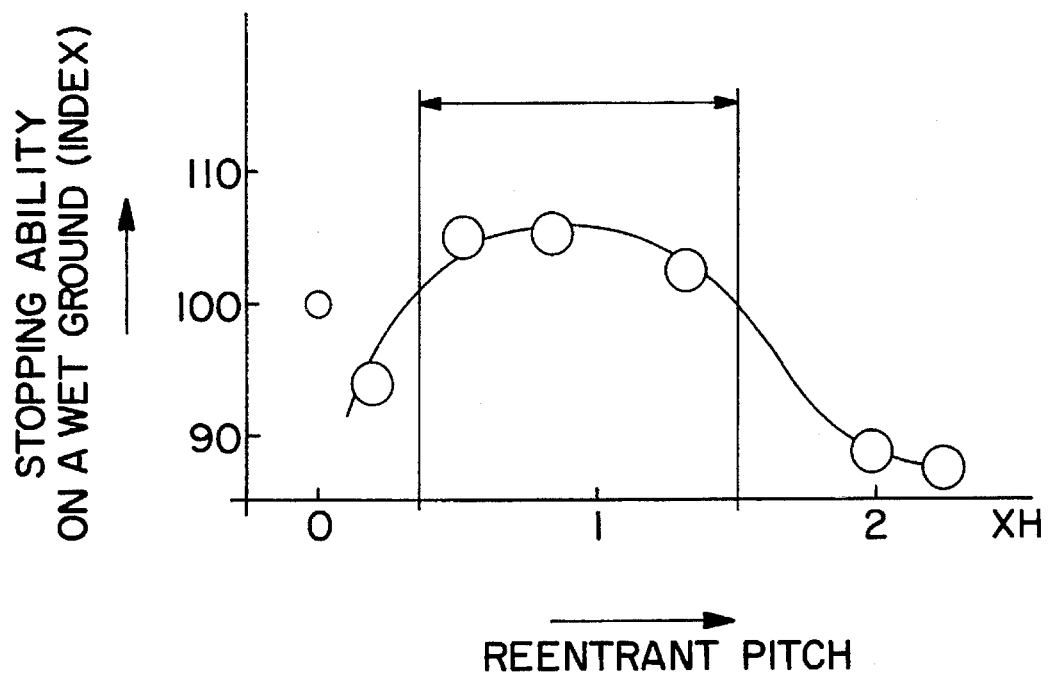
FIG. 7 shows the relationship between the index of stopping ability on a wet surface and a pitch P of the reentrants.

*Breakage of the zigzag tips and occurrence of wear like sawtooth
**Occurrence of furrow wear on zigzag tips From these results, it appeared that the reentrants formed on the groove wall had certain preferable pitch intervals P. Accordingly, the relation between the stopping ability index on a wet ground and the reentrant pitch were evaluated and the results are shown in FIG. 7 wherein the ordinate represents the stopping ability and the abscissa the reentrant pitch P. As a result, it was confined that the pitch interval P of the reentrants at the groove bottom was preferred to be 30 to 150% of the groove depth H. Pitch interval P can be 40–80% of the groove depth H.

As mentioned above, in the heavy duty radial tire having the reentrants formed on the groove wall and increasing in width and depth toward the groove bottom in accordance with the present invention, the rigidity of the rib base is reduced so that less movement occurs at the rib edges on the rib surface and thereby the occurrence of the furrow wear is prevented. In addition, since the reentrants formed on the groove walls increase in width and depth toward the groove bottom, the zigzag configuration becomes intensive in proportion to the progress of the tread wear and thereby the stopping ability on a wet ground is ensured.

We claim:

1. A heavy duty radial tire comprising a tread wherein the tread is defined by a rib pattern comprising a plurality of circumferential grooves and a plurality of ribs formed therebetween, each of said grooves having a depth H and being of a trapezoidal configuration in cross-section with groove edges extending straight in a circumferential direction of said tire and slant groove walls which decrease a groove width toward a groove bottom, wherein a plurality of reentrants in a form of trigonal pyramid which increase in width and depth toward the groove bottom are formed in a circumferential direction of said tire with triangular slant groove walls remaining therebetween on the slant groove walls of at least a pair of grooves, the ratio of circumferential pitch P of said reentrants to the depth H being within the range of 0.3 and 1.5 wherein the circumferential pitch P of said reentrants is the distance between adjacent apexes of the triangular slant groove walls, and the reentrants formed in a form of trigonal pyramid on one groove wall and the triangular slant groove walls formed on the other groove wall face each other.

2. A heavy duty radial tire claimed in claim 1, wherein the ratio of pitch P of said reentrants to the depth H is within the range of 0.4 and 0.8.

3. A heavy duty radial tire claimed in claim 1 wherein said reentrants are between from a lower level of each of said grooves and the bottom of each of said grooves.

4. A heavy duty radial tire claimed in claim 3, wherein the ratio of pitch P of said reentrants to the depth H is within the range of 0.4 and 0.8.

* * * * *